United States Patent
Lee et al.

(10) Patent No.: US 8,447,432 B2
(45) Date of Patent: May 21, 2013

(54) REFRIGERATOR AND CONTROL METHOD FOR THE SAME

(75) Inventors: Moo Yeon Lee, Seoul (KR); Jong Jin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 908 days.

(21) Appl. No.: 12/521,043

(22) PCT Filed: Nov. 15, 2007

(86) PCT No.: PCT/KR2007/005732
§ 371 (c)(1),
(2), (4) Date: Jun. 24, 2009

(87) PCT Pub. No.: WO2008/078876
PCT Pub. Date: Jul. 3, 2008

(65) Prior Publication Data
US 2010/0100243 A1    Apr. 22, 2010

(30) Foreign Application Priority Data
Dec. 26, 2006 (KR) .................. 10-2006-0133846

(51) Int. Cl.
*G06F 19/00* (2011.01)
*F25D 11/02* (2006.01)

(52) U.S. Cl.
USPC ........................................... 700/275; 62/441

(58) Field of Classification Search
USPC ................. 700/275; 62/426, 441, 498
See application file for complete search history.

(56) References Cited

U.S. PATENT DOCUMENTS

| | | | |
|---|---|---|---|
| 3,786,648 A | 1/1974 | Rice | |
| 5,157,943 A * | 10/1992 | Jaster et al. | 62/513 |
| 5,477,915 A | 12/1995 | Park | |
| 5,711,159 A * | 1/1998 | Whipple, III | 62/82 |
| 5,715,693 A | 2/1998 | Van der Walt et al. | |
| 5,931,004 A * | 8/1999 | Yoo et al. | 62/82 |
| 6,327,867 B1 * | 12/2001 | Hyodo et al. | 62/187 |
| 6,370,895 B1 | 4/2002 | Sakuma et al. | |
| 6,490,877 B2 | 12/2002 | Bash et al. | |
| 6,622,498 B2 * | 9/2003 | Park et al. | 62/154 |
| 6,775,998 B2 * | 8/2004 | Yuasa et al. | 62/197 |
| 2002/0166331 A1 * | 11/2002 | Park et al. | 62/151 |
| 2004/0050083 A1 * | 3/2004 | Yuasa et al. | 62/222 |
| 2007/0033962 A1 * | 2/2007 | Kang et al. | 62/441 |

FOREIGN PATENT DOCUMENTS

| | | |
|---|---|---|
| CN | 1380527 A | 11/2002 |
| CN | 1479064 A | 3/2004 |
| CN | 1532502 A | 9/2004 |
| EP | 1 394 481 | 3/2004 |

(Continued)

OTHER PUBLICATIONS

Korean Decision to Grant a Patent dated Feb. 1, 2008 for Application No. 10-2006-0133846.

(Continued)

*Primary Examiner* — Charles Kasenge
(74) *Attorney, Agent, or Firm* — KED & Associates LLP

(57) ABSTRACT

A refrigerator and a control method for the same are disclosed. Precise temperature control for plural cooling compartments can be achieved so that the cooling compartments can be respectively cooled down in various temperature zones, the temperature in the cooling compartments can be efficiently controlled, and a refrigerant does not remain in the system. Accordingly, the overall performance of the system is enhanced.

19 Claims, 6 Drawing Sheets

FOREIGN PATENT DOCUMENTS

| | | |
|---|---|---|
| EP | 1 424 530 | 6/2004 |
| JP | 48-035550 U | 4/1973 |
| JP | 55-038437 A | 3/1980 |
| JP | 55-044145 U | 3/1980 |
| JP | 57-196973 U | 12/1982 |
| JP | 58-162456 U | 10/1983 |
| JP | 01-247978 A | 10/1989 |
| JP | 08-005172 | 1/1996 |
| JP | 2001-263902 | 9/2001 |
| JP | 2003-139459 A | 5/2003 |
| JP | 2003-207249 A | 7/2003 |
| JP | 2003-214743 | 7/2003 |
| KR | 10-1996-0024150 A | 7/1996 |
| KR | 10-1998-017939 A | 6/1998 |
| KR | 10-2000-0022624 A | 4/2000 |
| KR | 10-2002-0085373 A | 11/2002 |
| KR | 10-2003-0062212 A | 7/2003 |
| KR | 10-2006-0017727 A | 2/2006 |
| WO | WO 96/15413 | 5/1996 |

OTHER PUBLICATIONS

Korean Decision to Grant a Patent dated Dec. 20, 2007 issued in Application No. 10-2006-0110670.
International Search Report dated Jun. 10, 2008.
Chinese Office Action dated May 25, 2010 issued in Application No. 200780041713.0.
Chinese Office Action dated Nov. 15, 2010 issued in Application No. 200780041713.0.

\* cited by examiner

REFRIGERATOR AND CONTROL METHOD FOR THE SAME

TECHNICAL FIELD

The present invention relates to a refrigerator and a control method for the same, and more particularly, to a refrigerator and a control method for the same capable of achieving cooling compartments generating cold air of various temperature zones.

BACKGROUND ART

A refrigeration cycle is a cycle of a series of thermodynamic processes of absorbing heat from a low-temperature heat source and giving heat to a high-temperature heat source. A refrigeration cycle generally includes a compressor, a condenser, an expansion valve, and an evaporator.

A compressor compresses refrigerant, and discharges refrigerant gas of high temperature and high pressure. A condenser condenses the refrigerant of high temperature and high pressure discharged from the compressor into liquid refrigerant of intermediate temperature and high pressure or low temperature and high pressure. An expansion valve expands the refrigerant of intermediate temperature and high pressure or low temperature and high pressure into a refrigerant of low temperature and low pressure. The expanded refrigerant is evaporated in an evaporator. At this time, a temperature and a pressure of the refrigerant drop more. Since the refrigerant absorbs ambient heat when it is evaporated, the ambient air is cooled down.

The refrigerant circulating through the cycle as described above is sucked again into the compressor to be compressed. Then, the refrigerant circulates repeatedly through the aforementioned cycle. The evaporator absorbs ambient heat, and thereby generates cold air. A refrigerator is constituted such that cold air is blown into a refrigerating compartment by a fan to cool down the interior of the refrigerating compartment.

A conventional refrigerator includes a freezing compartment, a refrigerating compartment and the above-described refrigeration cycle device in such a way that the evaporator is mounted in the freezing compartment to generate cold air having a temperature zone necessary for the freezing compartment, and a portion of the cold air in the freezing compartment is supplied into the refrigerating compartment to cool down the interior of the refrigerating compartment. However, the conventional refrigerator has a problem such that the temperature distribution in the refrigerating compartment is very irregular and also the temperature distribution in the freezing compartment becomes irregular because the cold air is supplied from the freezing compartment into the refrigerating compartment.

Accordingly, in order to solve such a problem, there has been required a technique capable of controlling independently the temperature in the freezing compartment and the refrigerating compartment and maintaining the temperature distribution in the freezing compartment and the refrigerating compartment as regular.

Further, the conventional refrigerator includes only the freezing compartment which is a cooling compartment having a relatively low-temperature zone and the refrigerating compartment which is a cooling compartment having a relatively high-temperature zone. Therefore, there has been required a technique capable of satisfying a user's desire by providing a refrigerator with plural cooling compartments having various temperature zones, for example, a cooling compartment having an intermediate temperature zone between the temperature zones in the refrigerating compartment and the freezing compartment, a cooling compartment having a temperature zone higher than the temperature zone in the refrigerating compartment, and the like.

DISCLOSURE OF INVENTION

Technical Problem

An object of the present invention devised to solve the problem lies on a refrigerator having plural cooling compartments capable of achieving cooling performance stably and uniformly in various temperature zones.

Another object of the present invention devised to solve the problem lies on a method for controlling the above refrigerator so that the plural cooling compartments have various temperature zones.

Technical Solution

The objects of the present invention can be achieved by providing a refrigerator comprising: a main body provided with plural cooling compartments; a compressor to compress a refrigerant and discharge the refrigerant; a condensing unit to condense the refrigerant discharged from the compressor; a distribution device to distribute the refrigerant condensed by the condensing unit; a first cold air generating unit including plural evaporators connected to each other in a series form to generate cold air in a part of the plural cooling compartments through the refrigerant distributed to one direction from the distribution device, and plural fans to blow the cold air generated from the respective evaporators; a second cold air generating unit including at least one evaporator connected to the first cold air generating unit in a parallel form to generate cold air in the other part of the plural cooling compartments through the refrigerant distributed to the other direction from the distribution device, at least one fan to blow the cold air generated from the evaporator, and a control valve by which the second cold air generating unit is selectively connected with the first cold air generating unit in a series form; a sensing part to sense a temperature in each of the cooling compartments; and a control part to control a temperature in each of the cooling compartments according to the temperature sensed by the sensing part.

The cooling compartments may include a first refrigerating compartment, a second refrigerating compartment and a freezing compartment. The first cold air generating unit may include a first evaporator and a first fan which are mounted in the first refrigerating compartment, and a second evaporator and a second fan which are mounted in the second refrigerating compartment. The second cold air generating unit may include a third evaporator and a third fan which are mounted in the freezing compartment.

In another aspect of the present invention, provided herein is a control method for a refrigerator, the control method comprising: sensing a temperature in each of plural cooling compartments; determining an operating mode by determining whether the temperature in each of the cooling compartments is within a set temperature zone; and controlling a refrigeration cycle device according to the determined operating mode to make the temperature in each of the cooling compartments included in the set temperature zone.

The plural cooling compartments may include a first refrigerating compartment provided with a first evaporator and a first fan, a second refrigerating compartment provided with a second evaporator and a second fan, and a freezing compartment provided with a third evaporator and a third fan.

When a first operating mode for cooling down the first refrigerating compartment, the second refrigerating compartment and the freezing compartment is determined at the step of determining the operating mode, the step of controlling the refrigeration cycle device may include: operating a compressor; fully opening a distribution device; and operating the first fan, the second fan and the third fin.

When a second operating mode for cooling down the first refrigerating compartment and the freezing compartment is determined at the step of determining the operating mode, the step of controlling the refrigeration cycle device may include: operating a compressor; hilly opening a distribution device; and operating the first fan and the third fan and stopping operation of the second fan.

When a third operating mode for cooling down the second refrigerating compartment and the freezing compartment is determined at the step of determining the operating mode, the step of controlling the refrigeration cycle device may include: operating a compressor; fully opening a distribution device; and operating the second fan and the third fan and stopping operation of the first fan.

When a fourth operating mode for cooling down the freezing compartment is determined at the step of determining the operating mode, the step of controlling the refrigeration cycle device may include: operating a compressor; opening an F side of a distribution device and closing an R side of the distribution device; and operating the third fan and stopping operation of the first fan and the second fan.

When a fourth operating mode for cooling down the freezing compartment is determined at the step of determining the operating mode, the step of controlling the refrigeration cycle device may include: operating a compressor; opening an F side of a distribution device and closing an R side of the distribution device; and operating the third fan and stopping operation of the first fan and the second fan.

When a fifth operating mode for cooling down the first refrigerating compartment and the second refrigerating compartment is determined at the step of determining the operating mode, the step of controlling the refrigeration cycle device may include: operating a compressor; closing an F side of a distribution device and opening an R side of the distribution device; and operating the first En and the second fan and stopping operation of the third fan.

When a sixth operating mode for cooling down the first refrigerating compartment is determined at the step of determining the operating mode, the step of controlling the refrigeration cycle device may include: operating a compressor; closing an F side of a distribution device and opening an R side of the distribution device; and operating the first fan and stopping operation of the second fan and the third fan.

When a seventh operating mode for cooling down the second refrigerating compartment is determined at the step of determining the operating mode, the step of controlling the refrigeration cycle device may include: operating a compressor; closing an F side of a distribution device and opening an R side of the distribution device; and operating the second fan and stopping operation of the first fan and the third fan.

When it is determined that the temperature in the first refrigerating compartment, the second refrigerating compartment and the freezing compartment is equal to or less than a maximum value in each set temperature zone, and an eighth operating mode is determined at the step of determining the operating mode, the step of controlling the refrigeration cycle device may include stopping operation of a compressor, the first fan, the second fin and the third fan.

The control method may further comprise: determining whether at least one of the first refrigerating compartment and the second refrigerating compartment is subcooled and the temperature in the subcooled cooling compartment is lower than a minimum value in each set temperature zone; and when it is determined that at least one of the first refrigerating compartment and the second refrigerating compartment is subcooled, operating the fan in the subcooled cooling compartment while stopping operation of the compressor until the temperature in the subcooled cooling compartment is included in the set temperature zone.

The control method may further comprise: determining whether at least one of the first refrigerating compartment and the second refrigerating compartment is subcooled and the temperature in the subcooled cooling compartment is lower than a minimum value in each set temperature zone; and when it is determined that at least one of the first refrigerating compartment and the second refrigerating compartment is subcooled, operating the fan in the subcooled cooling compartment for a set time while stopping operation of the compressor.

The control method may further comprise opening a control valve to connect the first and second evaporators and the third evaporator in a series form, through which a refrigerant flows. A pressure difference between the first and second evaporators and the third evaporator may be removed, and the refrigerant may circulate smoothly through the refrigeration cycle device.

The control method may further comprise: when the temperature in the first refrigerating compartment, the second refrigerating compartment and the freezing compartment is included in each set temperature zone by the second operating mode, collecting a residual refrigerant in the refrigeration cycle device by operating the compressor for a set time while stopping operation of the first fan, the second fan and the third fan and fully closing the distribution device.

The control method may further comprise: when the temperature in the first refrigerating compartment, the second refrigerating compartment and the freezing compartment is included in each set temperature zone by the third operating mode, collecting a residual refrigerant in the refrigeration cycle device by operating the compressor for a set time while stopping operation of the first fan, the second fan and the third fan and fully closing the distribution device.

The control method may further comprise: when the temperature in the first refrigerating compartment, the second refrigerating compartment and the freezing compartment is included in each set temperature zone by the fifth operating mode, collecting a residual refrigerant in the refrigeration cycle device by operating the compressor for a set time while stopping operation of the first fan, the second fan and the third fan and fully closing the distribution device.

The control method may further comprise: when the temperature in the first refrigerating compartment, the second refrigerating compartment and the freezing compartment is included in each set temperature zone by the sixth operating mode, collecting a residual refrigerant in the refrigeration cycle device by operating the compressor for a set time while stopping operation of the first fan, the second fan and the third fun and fully closing the distribution device.

The control method may further comprise: when the temperature in the first refrigerating compartment, the second refrigerating compartment and the freezing compartment is included in each set temperature zone by the seventh operating mode, collecting a residual refrigerant in the refrigeration cycle device by operating the compressor for a set time while stopping operation of the first fan, the second fan and the third fan and fully closing the distribution device.

Advantageous Effects

As described above, according to the refrigerator and the control method for the same of the present invention, the precise temperature control for the cooling compartments can be achieved so that the cooling compartments can be respectively cooled down in various temperature zones, the temperature in the cooling compartments can be efficiently controlled, and the refrigerant does not remain in the system. Accordingly, the overall performance of the system is enhanced.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

MODE FOR THE INVENTION

Reference will now be made in detail to the preferred embodiments of the present invention, examples of which are illustrated in the accompanying drawings.

Figure 1:
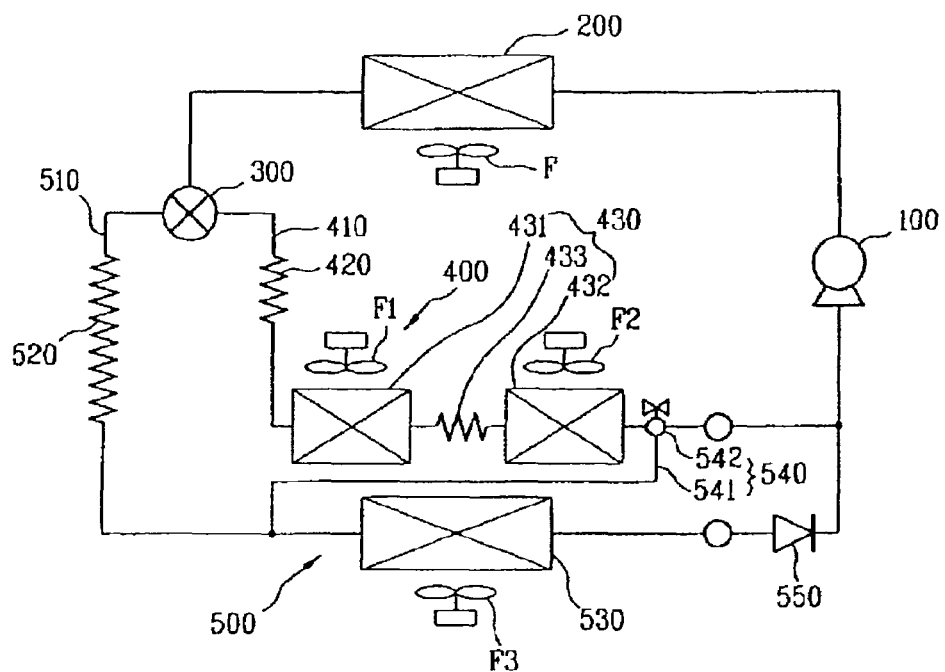
FIG. 1 illustrates a schematic view of a refrigeration cycle device to generate and supply cold air in a refrigerator according to an exemplary embodiment of the present invention.

As shown in FIG. 1, a refrigeration cycle device of a refrigerator according to the present invention includes a compressor 100 to compress refrigerant and discharge the same, a condensing unit 200 connected to the compressor 100 to condense the compressed refrigerant, a distribution device 300 to distribute the refrigerant passing through the condensing unit 200 into a first refrigerant passage 410 and a second refrigerant passage 510, and cold air generating units 400 and 500 including plural evaporators 431, 432 and 530 connected to each other in series and parallel forms in the first refrigerant passage 410 and the second refrigerant passage 510 to generate cold air of respectively different temperature zones.

The compressor 100 may be configured as a constant speed compressor, as well as a capacity variable compressor which can adjust the amount of refrigerant to be compressed so as to change the cooling power depending on various cooling loads. In a case where a constant speed compressor is used, the constant amount of refrigerant is discharged from the compressor. Therefore, it is possible to change the cooling power by regulating the distribution device 300, expansion devices or valves.

The distribution device 300 distributes the condensed refrigerant discharged from the condensing unit 200 into the first refrigerant passage 410 and the second refrigerant passage 510. A 3-way valve may be used as the distribution device 300.

The cold air generating units 400 and 500 include a first cold air generating unit 400 and a second cold air generating unit 500. The first cold air generating unit 400 includes the first refrigerant passage 410, a first expansion device 420 mounted in the first refrigerant passage 410 to expand the refrigerant, and a first evaporating unit 430 to evaporate the refrigerant expanded in the first expansion device 420 and generate cold air of respectively different temperature zones.

The first evaporating unit 430 includes a first evaporator 431 to firstly evaporate the refrigerant expanded in the first expansion device 420 and generate cold air, an intermediate expansion device 433 to expand again the refrigerant evaporated in the first evaporator 431, and a second evaporator 432 to evaporate the refrigerant expanded in the intermediate expansion device 433 and generate cold air.

The second cold air generating unit 500 includes the second refrigerant passage 510, a second expansion device 520 mounted in the second refrigerant passage 510 to expand the refrigerant, a third evaporator 530 to evaporate the refrigerant expanded in the second expansion device 520 and generate cold air, and a connecting device 540 to connect the second refrigerant passage 510 and the first refrigerant passage 410 so that the refrigerant can flow selectively therethrough, thereby decreasing a pressure difference between the refrigerant flowing through the first evaporating unit 430 and the refrigerant flowing through the second refrigerant passage 510 and controlling a degree of superheat of the refrigerant passing through the first evaporating unit 430.

As shown in FIG. 1, the connecting device 540 connects the second refrigerant passage 510 and the first refrigerant passage 410. The connecting device 540 includes a connecting pipe 541 to connect a rear side portion of the second expansion device 520 in the second refrigerant passage 510 and a rear side portion of the second evaporator 432 in the first refrigerant passage 410, and a control valve 542 mounted in the connecting pipe 541 to control the flow of the refrigerant.

According to the opening and closing of the control valve 542, the first cold air generating unit 400 and the second cold air generating unit 500 are connected to each other selectively in series and parallel forms. In other words, when the control valve 542 is closed, the first cold air generating unit 400 and the second cold air generating unit 500 are connected to each other in the parallel form. Conversely, when the control valve 542 is opened, the first cold air generating unit 400 and the second cold air generating unit 500 are connected to each other in the series form.

The cold air generating mechanism of the refrigeration cycle device shown in FIG. 1 will now be explained with reference to FIG. 3.

Figure 3:
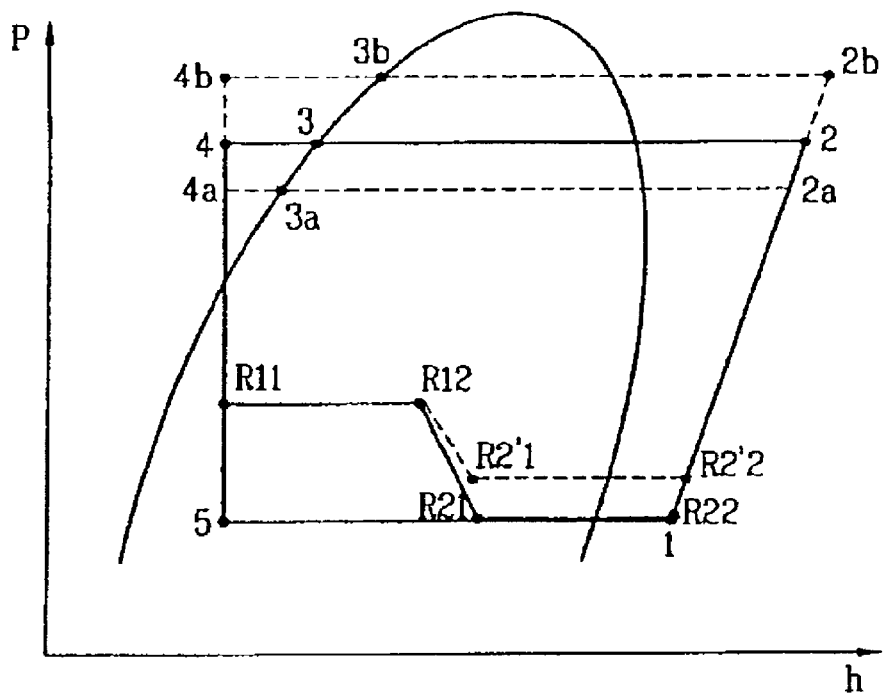
FIG. 3 is a view illustrating a P-H diagram of a refrigeration cycle of the refrigeration cycle device of the refrigerator according to the present invention.

First, to explain a P-H diagram shown in FIG. 3, a 1→2 process represents a process in which the refrigerant is compressed in the compressor 100, a 2→3→4 process represents a process in which the refrigerant is condensed in the condensing unit 200, a 4→R11 process represents a process in which the refrigerant is expanded in the first expansion device 420, and a 4→5 process represents a process in which the refrigerant is expanded in the second expansion device 520.

A R11→R12 process represents a process in which the refrigerant is evaporated in the first evaporator 431 and cold air is generated, a R12→R21 process represents a process in which the refrigerant is expanded in the intermediate expansion device 433 and a pressure drops, and a R21→R22 process represents a process in which the refrigerant is evaporated in the second evaporator 432 and cold air is generated.

A 5→1 process represents a process in which the refrigerant is evaporated in the third evaporator 530 of the second cold air generating unit 500 and cold air is generated.

The refrigeration cycle through the second cold air generating unit 500 is performed in an order of 1→2→3→4→5→1, and the refrigeration cycle through the first cold air generating unit 400 is performed in an order of R22→2→3→4→R11→R12→R21→R22.

As shown in FIG. 1, since the temperature zone of the cold air in the first cold air generating unit 400 is higher than that of the cold air in the second cold air generating unit 500, the first expansion device 420 has a length shorter than the second expansion device 520. Therefore, the pressure drop of the refrigerant in the second expansion device 520 is larger than the pressure drop of the refrigerant in the first expansion device 420. Accordingly, the refrigerant passing through the second expansion device 520 is a liquid refrigerant of low temperature and low pressure, and the liquid refrigerant is evaporated while flowing through the third evaporator 530 and absorbs ambient heat, thereby achieving the cooling performance. At this time, a temperature of the cold air is in the range of approximately −15° C. to −30° C. This process corresponds to the 5→1 process in the graph shown in FIG. 3.

The refrigerant passing through the first expansion device 420 is firstly evaporated while flowing through the first evaporator 431, and cold air is generated. As observed from the graph shown in FIG. 3, because the refrigerant flows through the first evaporator 431 in such a state that the pressure drop is not perfectly achieved, the quantity of refrigerant remaining in a liquid state is large. This means that the amount of heat absorbed by the evaporation in the first evaporator 431 from the ambient is small when compared to the second cold air generating unit 500 and thereby the first evaporator 431 has a relatively high temperature zone. The first evaporator 431 has a temperature zone of approximately 5° C. to −1° C. This process corresponds to the R11→R12 process in the graph shown in FIG. 3.

The refrigerant passing through the first evaporator 431 flows into the intermediate expansion device 433. While flowing through the intermediate expansion device 433, the refrigerant is expanded. This process corresponds to the R12→R21 process. The refrigerant thus expanded flows through the second evaporator 432 is evaporated, and thereby cold air is generated. At this time, the cold air has a temperature zone of approximately −1° C. to −7° C. This process corresponds to the R21→R22 process in the graph shown in FIG. 3.

The refrigerant passing through the first cold air generating unit 400 and the second cold air generating unit 500 is sucked again into the compressor 100, and the next cycle is performed. At this time, since the pressure of the refrigerant passing through the second cold air generating unit 500 is lower than the pressure of the refrigerant passing through the first cold air generating unit 400, a problem may occur such that the refrigerant passing through the first cold air generating unit 400 flows back toward the second cold air generating unit 500. To prevent the problem of back flow of the refrigerant, a check valve 550 is mounted in a rear side portion of the second cold air generating unit 500.

However, the check valve 550 thus mounted just prevents the refrigerant from flowing back toward the second cold air generating unit 500, but cannot solve a problem in which the refrigerant passing through the second cold air generating unit 500 cannot flow into the compressor 100 by the pressure difference. Therefore, in order to decrease the pressure difference and perfectly return the refrigerant into the compressor, the connecting device 540 is provided to connect the second cold air generating unit 500 and the first cold air generating unit 400.

As observed from the graph shown in FIG. 3, in a case where a R2'1→R2'2 process is performed because the pressure drop of the refrigerant is not sufficiently achieved, a large pressure difference occurs between the first cold air generating unit 400 and the second cold air generating unit 500. Accordingly, the control valve 542 is opened to decrease the pressure difference, thereby securing the smooth circulation of the refrigerant.

There may be a large difference between the temperature of the refrigerant passing through the first cold air generating unit 400 and the temperature of the refrigerant passing through the second cold air generating unit 500. In other words, a degree of superheat of the refrigerant may be large. This is because the temperature of the cold air generated in the first cold air generating unit 400 is higher than the temperature of the cold air generated in the second cold air generating unit 500. In a case where the degree of superheat is large, it is not preferable because the refrigerant returning to the compressor 100 is highly possibly phase-changed into a liquid state from a gas state.

In order to solve the above problem of the degree of superheat, the control valve 542 is opened, so that the refrigerant passing through the first cold air generating unit 400 is also directed toward the second cold air generating unit 500. In other words, the refrigerant passing through the first cold air generating unit 400 is bypassed to the second refrigerant passage 510 via the connecting pipe 541.

The first evaporator 431 and a first fan F1 of the first cold air generating unit 400 are mounted in a first refrigerating compartment of the refrigerator according to the present invention, and the second evaporator 432 and a second fan F2 are mounted in a second refrigerating compartment. The third evaporator 530 and a third fan F3 of the second cold air generating unit 500 are mounted in a freezing compartment. Accordingly, the first fan F1 supplies the cold air generated from the first evaporator 431 into the first refrigerating compartment, the second fan F2 supplies the cold air generated from the second evaporator 432 into the second refrigerating compartment, and the third fan F3 supplies the cold air generated from the third evaporator 530 into the freezing compartment.

Figure 2:
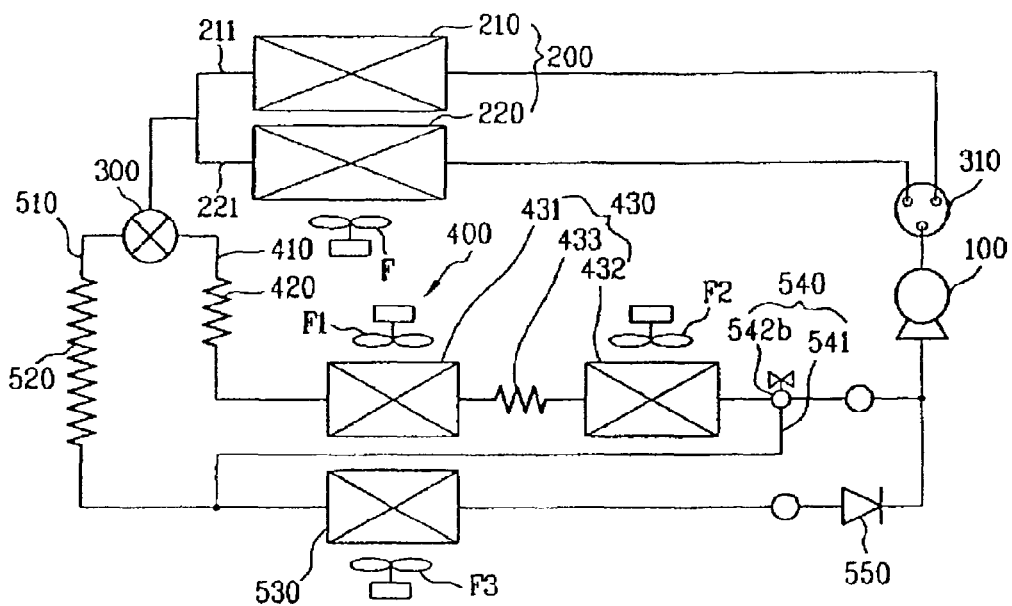
FIG. 2 illustrates a schematic view of a refrigeration cycle device to generate and supply cold air in a refrigerator according to another exemplary embodiment of the present invention.

Meanwhile, as shown in FIG. 2, a refrigeration cycle device of a refrigerator according to another embodiment of the present invention includes a compressor 100, and a condensing unit 200 having plural condensers (a first condenser 210 and a second condenser 220). A distribution valve 310 is mounted between the compressor 100 and the condensing unit 200. The distribution valve 310 distributes the refrigerant discharged from the compressor 100 so as to flow into the first condenser 210 and the second condenser 220. A 3-way valve may be used as the distribution valve 310.

Because the first condenser 210 and the second condenser 220 condense the refrigerant which is respectively directed toward a first cold air generating unit 400 and a second cold air generating unit 500, the first condenser 210 and the second condenser 220 having different sizes from each other may be provided.

FIG. 3 illustrates a P-H diagram of the refrigeration cycle device capable of achieving the optimum condensation adequate for loads of the respective evaporators by the first condenser and the second condenser.

As shown in the P-H diagram in FIG. 3, according to a case where any one of the condensers 210 and 220 shown in FIG.

2 is used or a case where all of the condensers are used, the amount of heat radiation from the condensing unit by the refrigerant circulating through the refrigeration cycle can be set to be different. In other words, the refrigeration cycle device can be driven while adequately adjusting condensing efficiency for loads such as sizes of the evaporators. The amount of heat radiation varies depending on a length of a $2a \rightarrow 3a \rightarrow 4a$ process or a $2b \rightarrow 3b \rightarrow 4b$ process. The large amount of heat radiation means that the quantity of the condensed refrigerant is large.

As shown in FIG. 3, when a part of the evaporators of the refrigeration cycle device is driven, the refrigeration cycle is performed in the $2a \rightarrow 3a \rightarrow 4a$ process. When the number of the driven evaporators is increased and thus the more condensation of the refrigerant is required, the refrigeration cycle is performed in the $2b \rightarrow 3b \rightarrow 4b$ process. Here, the $2a \rightarrow 3a \rightarrow 4a$ process and the $2b \rightarrow 3b \rightarrow 4b$ process have a precondition such that the pressure of the refrigerant discharged from the compressor is changed by the variation of the capacity of the compressor. In other words, the refrigeration cycle adequate for the loads if the respective evaporators can be selectively achieved.

Accordingly, in a case where any one of the first cold air generating unit 400 and the second cold air generating unit 500 is operated, the condenser adequate therefor can be selectively used. Thus, condensation loss can be considerably decreased when compared to a case where only a big condenser is used. Also, in a case where both the first cold air generating unit 400 and the second cold air generating unit 500 are operated, the two condensers are used all together. Thus, condensing efficiency is increased, and thereby overall efficiency of the system can be increased.

In the refrigeration cycle shown in FIG. 2, the first condenser 210 and the second condenser 220 are connected to a distribution device 300 in such a way that a pipe 211 extending from the first condenser 210 and a pipe 221 extending from the second condenser 220 are joined to a common pipe 230 extending to the distribution device 300. Therefore, it is more preferable to sequentially use the first condenser 210 and the second condenser 220 having different condensing capacitors from each other than to use the first condenser 210 and the second condenser 220 at the same time.

Figure 4:
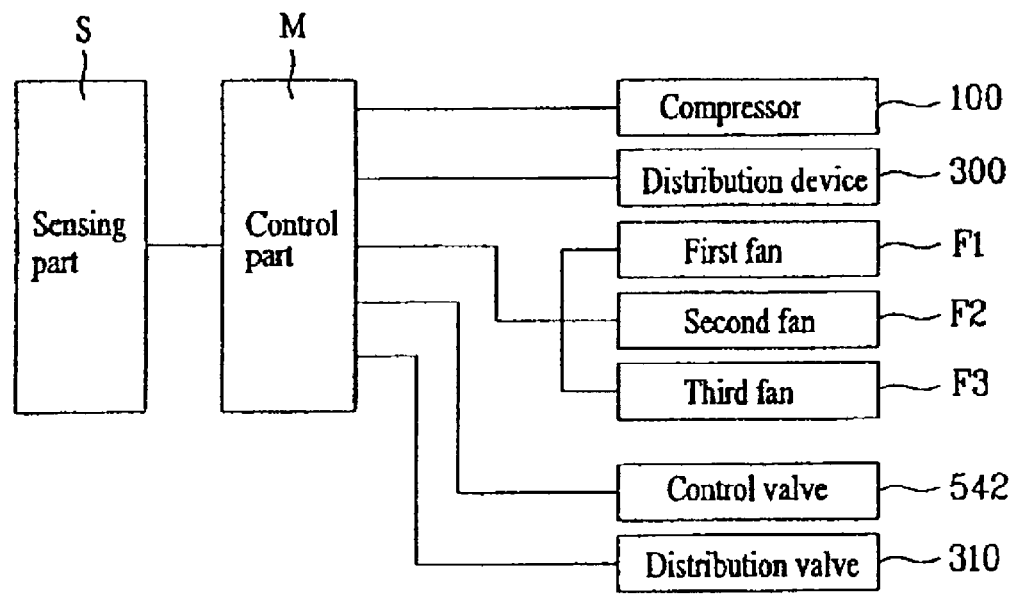
FIG. 4 is a block diagram illustrating a control system of the refrigerator according to the present invention.

FIG. 4 illustrates a control system of the refrigerator according to the present invention shown in FIGS. 1 and 2. A control part M is electrically connected with a sensing part S (the sensing part S includes temperature sensors mounted in the respective cooling compartments and components having a role of detecting which cooling compartment is operated by a user). According to a result of comparing a temperature sensed by the sensing part S with a set temperature, the control part M controls the compressor 100, the distribution device 300, the first fan F1, the second fan F2, the third fan F3, the control valve 542, and the distribution valve 310.

Hereinafter, embodiments of a control method for the refrigerator according to the present invention will be described with reference to FIGS. 5 to 8.

In FIGS. 5 to 8, a reference character Tf denotes a temperature in the freezing compartment sensed by the sensing part, a reference character Tr1 denotes a temperature in the first refrigerating compartment sensed by the sensing part, and a reference character Tr2 denotes a temperature in the second refrigerating compartment sensed by the sensing part. A reference character Tfs denotes a set temperature at which the interior of the freezing compartment should be maintained, a reference character Trs1 denotes a set temperature which is set as the maximum temperature in the first refrigerating compartment, a reference character Trc1 denotes a set temperature which is set as the minimum temperature in the first refrigerating compartment, a reference character Trs2 denotes a set temperature which is set as the maximum temperature in the second refrigerating compartment, and a reference character Trc2 denotes a set temperature which is set as the minimum temperature in the second refrigerating compartment.

It is preferable to satisfy the temperature conditions of $Tfs \geq Tf$, $Trs1 \geq Tr1 \geq Trc1$, and $Trs2 \geq Tr2 \geq Trc2$.

Figure 5:
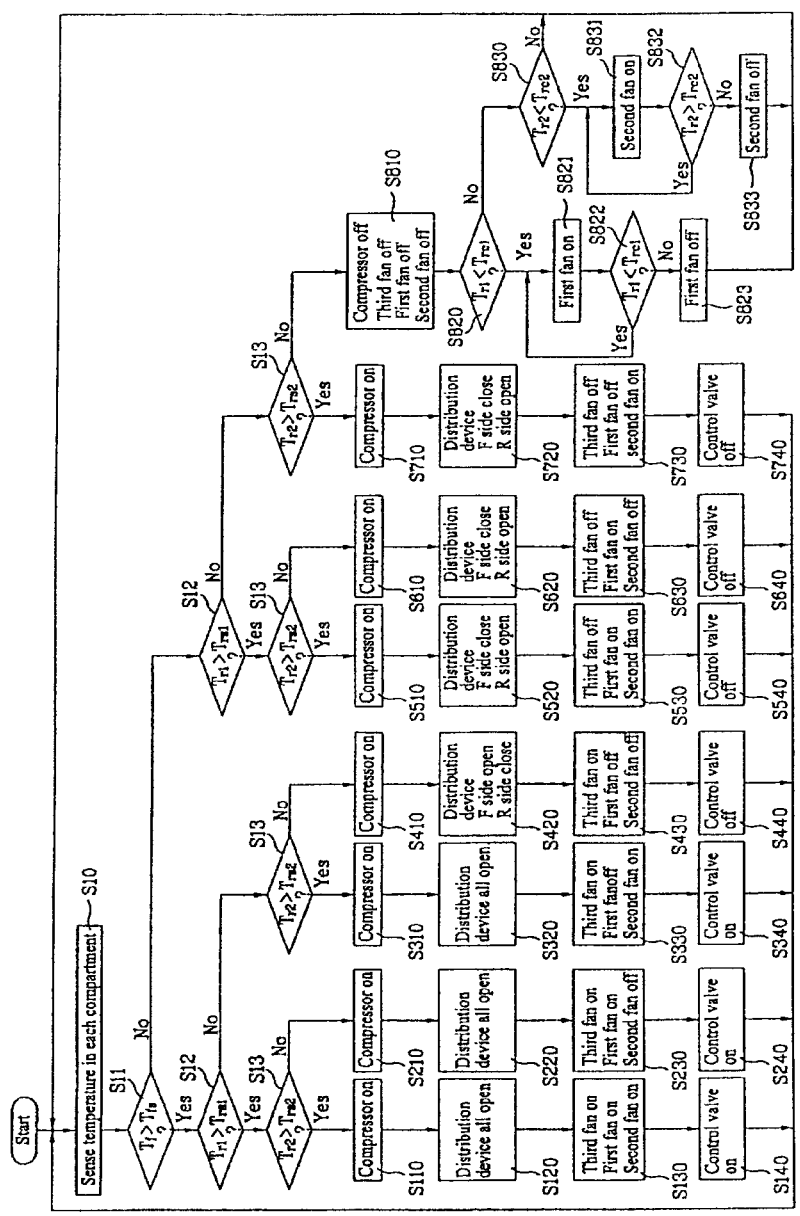
FIG. 5 is a flow chart illustrating a method for controlling the refrigerator according to a first embodiment of the present invention.

As shown in FIG. 5, in a first embodiment of the control method for the refrigerator according to the present invention, a temperature in each of the cooling compartments is sensed at step S10, and it is determined whether the temperature in each of the cooling compartments is within a set temperature zone. In other words, it is sequentially determined whether Tf is higher than Tfs at step S11, whether Tr1 is higher than Trs1 at step S12, and whether Tr2 is higher than Trs2 at step S13.

According to the results of the aforementioned determination steps, an operating mode is determined. In a case where Tf is higher than Tfs, Tr1 is higher than Trs1, and Tr2 is higher than Trs2 ($Tf>Tfs$, $Tr1>Trs1$, and $Tr2>Trs2$), a first operating mode is performed.

In a case where Tf is higher than Tfs, Tr1 is higher than Trs1, and Tr2 is equal to or less than Trs2 ($Tf>Tfs$, $Tr1>Trs1$, and $Tr2 \leq Trs2$), a second operating mode is performed.

In a case where Tf is higher than Tfs, Tr1 is equal to or less than Trs1, and Tr2 is higher than Trs2 ($Tf>Tfs$, $Tr1 \leq Trs1$, and $Tr2>Trs2$), a third operating mode is performed.

In a case where Tf is higher than Tfs, Tr1 is equal to or less than Trs1, and Tr2 is equal to or less than Trs2 ($Tf>Tfs$, $Tr1 \leq Trs1$, and $Tr2 \leq Trs2$), a fourth operating mode is performed.

In a case where Tf is equal to or less than Tfs, Tr1 is higher than Trs1, and Tr2 is higher than Trs2 ($Tf \leq Tfs$, $Tr1>Trs1$, and $Tr2>Trs2$), a fifth operating mode is performed.

In a case where Tf is equal to or less than Tfs, Tr1 is higher than Trs1, and Tr2 is equal to or less than Trs2 ($Tf \leq Tfs$, $Tr1>Trs1$, and $Tr2 \leq Trs2$), a sixth operating mode is performed.

In a case where Tf is equal to or less than Tfs, Tr1 is equal to or less than Trs1, and Tr2 is higher than Trs2 ($Tf \leq Tfs$, $Tr1 \leq Trs1$, and $Tr2>Trs2$), a seventh operating mode is performed.

In a case where Tf is equal to or less than Tfs, Tr1 is equal to or less than Trs1, and Tr2 is equal to or less than Trs2 ($Tf \leq Tfs$, $Tr1 \leq Trs1$, and $Tr2 \leq Trs2$), an eighth operating mode is performed.

In the first operating mode, the compressor is operated at step S110, and the distribution device is fully opened at step S120. The distribution device distributes the refrigerant to be supplied to the first cold air generating unit and the second cold air generating unit (here, a side of the distribution device directed to the first cold air generating unit is defined as an R side, and a side of the distribution device directed to the second cold air generating unit is defined as an F side). At step S120, the refrigerant is supplied to both the F side and the R side. In such a first operating mode, the control part operates the first fan, the second fan and the third fin at step S130. At this time, the control part opens the control valve to get rid of the pressure difference between the F side and the R side at step S140. Then, the process goes back to step S10.

In the second operating mode, the compressor is operated at step S210, and the distribution device is hilly opened at step S220. In other words, the refrigerant is supplied to both the F side and the R side. The first fan and the third fan are operated, and the operation of the second fan is stopped at step S230. At this time, the control part opens the control valve to get rid of the pressure difference between the F side and the R side at step S240. Then, the process goes back to step S10.

In the third operating mode, the compressor is operated at step S310, and the distribution device is fully opened at step S320. In other words, the refrigerant is supplied to both the F side and the R side. The second fan and the third fan are operated, and the operation of the first fan is stopped at step S330. At this time, the control part opens the control valve to get rid of the pressure difference between the F side and the R side at step S340. Then, the process goes back to step S10.

In the fourth operating mode, the compressor is operated at step S410, and the F side of the distribution device is opened and the R side of the distribution device is closed at step S420. In other words, the refrigerant is supplied to the F side, and the refrigerant is not supplied to the R side. The third fan is operated, and the operation of the first fan and the second fan is stopped at step S430. At this time, the control part closes the control valve at step S440. Then, the process goes back to step S10.

In the fifth operating mode, the compressor is operated at step S510, and the F side of the distribution device is closed and the R side of the distribution device is opened at step S520. In other words, the refrigerant is supplied to the R side, and the refrigerant is not supplied to the F side. The first fan and the second fan are operated, and the operation of the third fan is stopped at step S530. At this time, the control part closes the control valve at step S540. Then, the process goes back to step S10.

In the sixth operating mode, the compressor is operated at step S610, and the F side of the distribution device is closed and the R side of the distribution device is opened at step S620. In other words, the refrigerant is supplied to the R side, and the refrigerant is not supplied to the F side. The first fan is operated, and the operation of the second fan and the third fan is stopped at step S630. At this time, the control part closes the control valve at step S640. Then, the process goes back to step S10.

In the seventh operating mode, the compressor is operated at step S710, and the F side of the distribution device is closed and the R side of the distribution device is opened at step S720. In other words, the refrigerant is supplied to the R side, and the refrigerant is not supplied to the F side. The second fan is operated, and the operation of the first fin and the third fan is stopped at step S730. At this time, the control part closes the control valve at step S740. Then, the process goes back to step S10.

In the eighth operating mode, the operation of the compressor, the first fan, the second fan and the third fan is totally stopped at step S810. Because the conditions of $Tf \leq Tfs$, $Tr1 \leq Trs1$, and $Tr2 \leq Trs2$ are satisfied in the eighth operating mode, it is not necessary to supply the cold air into the respective cooling compartments any more. Therefore, the operation of the compressor and the fins is totally stopped. However, the temperature in the first refrigerating compartment and the second refrigerating compartment is not only maintained low, but should be also maintained above a predetermined temperature. In other words, as described above, the temperature $Tr1$ in the first refrigerating compartment should satisfy the condition of $Trs1 \geq Tr1 \geq Trc1$, and the temperature $Tr2$ in the second refrigerating compartment should satisfy the condition of $Trs2 \geq Tr2 \geq Trc2$. Therefore, in the eighth operating mode, in addition to determining whether $Tr1 \leq Trs1$ and $Tr2 \leq Trs2$, it is also determined whether $Tr1 \geq Trc1$ and $Tr2 \geq Trc2$. If the temperature $Tr1$ in the first refrigerating compartment or the temperature $Tr2$ in the second refrigerating compartment is not within the set temperature zone, a separate control should be carried out so that the temperature in each of the refrigerating compartments is included in the set temperature zone. However, the temperature $Tf$ in the freezing compartment is very low, and it does not matter if the freezing compartment is cooled down to an extremely low temperature. In other words, because the minimum temperature does not exist in the freezing compartment and is meaningless, it is not necessary to consider the temperature in the freezing compartment.

Accordingly, in the eighth operating mode, after step S810, it is determined whether $Tr1$ is lower than $Trc1$ ($Tr1<Trc1$) at step S820. If it is determined that $Tr1$ is lower than $Trc1$ ($Tr1<Trc1$), only the first fan is operated without operating the evaporator at step S821, thereby increasing the temperature in the first refrigerating compartment. Thereafter, it is determined again whether $Tr1$ is lower than $Trc1$ ($Tr1<Trc1$) at step S822. If $Tr1$ is not equal to nor more than $Trc1$, step S821 is repeated. If $Tr1$ is equal to or more than $Trc1$ ($Tr1 \geq Trc1$), the operation of the first fan is stopped at step S823. Then, the process goes back to step S10.

If it is determined that $Tr1$ is not lower than $Trc1$ (i.e., $Tr1 \geq Trc1$) at step S820, it is determined whether $Tr2$ is lower than $Trc2$ ($Tr2<Trc2$) at step S830. If it is determined that $Tr2$ is lower than $Trc2$ ($Tr2<Trc2$), only the second fan is operated without operating the evaporator at step S831, thereby increasing the temperature in the second refrigerating compartment. Thereafter, it is determined again whether $Tr2$ is lower than $Trc2$ ($Tr2<Trc2$) at step S832. If $Tr2$ is not equal to nor more than $Trc2$, step S831 is repeated. If $Tr2$ is equal to or more than $Trc2$ ($Tr2 \geq Trc2$), the operation of the second fan is stopped at step S833. Then, the process goes back to step S10.

Hereinafter, a second embodiment of the control method for the refrigerator according to the present invention will be described with reference to FIG. 6.

Figure 6:
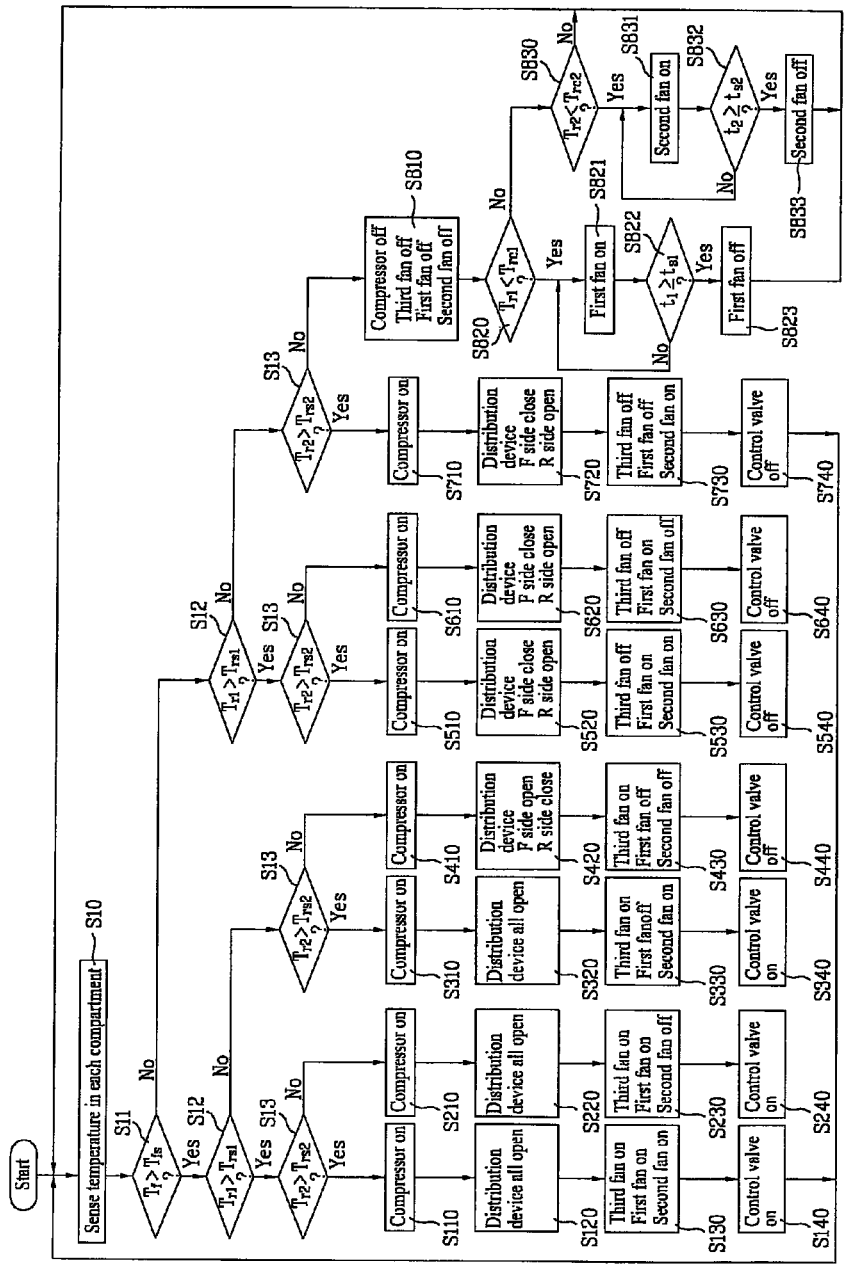
FIG. 6 is a flow chart illustrating a method for controlling the refrigerator according to a second embodiment of the present invention.

The second embodiment of the present invention shown in FIG. 6 has the same first to seventh operating modes as the first embodiment of the present invention shown in FIG. 5. Therefore, detailed explanation of first to seventh operating modes of the second embodiment of the present invention is substituted by the above explanation of the first to seventh operating modes of the first embodiment of the present invention shown in FIG. 5.

As shown in FIG. 6, in the second embodiment of the control method for the refrigerator according to the present invention, an eighth operating mode is performed when $Tf$ is equal to or less than $Tfs$, $Tr1$ is equal to or less than $Trs1$, and $Tr2$ is equal to or less than $Trs2$ ($Tf \leq Tfs$, $Tr1 \leq Trs1$, and $Tr2 \leq Trs2$). At this time, the operation of the compressor, the first fan, the second fan and the third fan is totally stopped at step S810.

As described above in the first embodiment of the present invention shown in FIG. 5, because the temperature $Tr1$ in the first refrigerating compartment should be maintained in a condition of $Trs1 \geq Tr1 \geq Trc1$ and the temperature $Tr2$ in the second refrigerating compartment should be maintained in a condition of $Trs2 \geq Tr2 \geq Trc2$, a separate control for satisfying the above conditions should be carried out.

Accordingly, after step S810, it is determined whether $Tr1$ is lower than $Trc1$ ($Tr1<Trc1$) at step S820. If it is determined that $Tr1$ is lower than $Trc1$ ($Tr1<Trc1$), only the first fan is operated without operating the evaporator at step S821, thereby increasing the temperature in the first refrigerating compartment. Thereafter, it is determined whether an operating time $t1$ of the first fan reaches a preset time $ts1$ at step S822. Here, the preset time $ts1$ is a time which is set based on experimental data about relation between a time of operating only the fan without operating the evaporator and a temperature to which the temperature in the cooling compartment rises for the operating time of the fan. After step S821, the control part determines whether t1 passes ts1 (t1≧ts1) at step S822. If it is determined that t1 does not reach ts1, step S821 is repeated. If it is determined that t1 passes ts1≧ts1), the operation of the first fan is stopped at step S823. Then, the process goes back to step S10.

If it is determined that Tr1 is not lower than Trc1 (i.e., Tr1≧Trc1) at step S820, it is determined whether Tr2 is lower than Trc2 (Tr2<Trc2) at step S830. If it is determined that Tr2 is lower than Trc2 (Tr2<Trc2), only the second fan is operated without operating the evaporator at step S831, thereby increasing the temperature in the second refrigerating compartment. Thereafter, it is determined whether an operating time t2 of the second fan reaches a preset time ts2 at step S832. Here, also the preset time ts2 is a time which is set based on the aforementioned experimental data. After step S831, the control part determines whether t2 passes ts2 (t2≧ts2) at step S832. If it is determined that t2 does not reach ts2, step S831 is repeated. If it is determined that t2 passes ts2 (t2≧ts2), the operation of the second fan is stopped at step S833. Then, the process goes back to step S10.

Hereinafter, a third embodiment of the control method for the refrigerator according to the present invention will be described with reference to FIG. 7.

Figure 7:
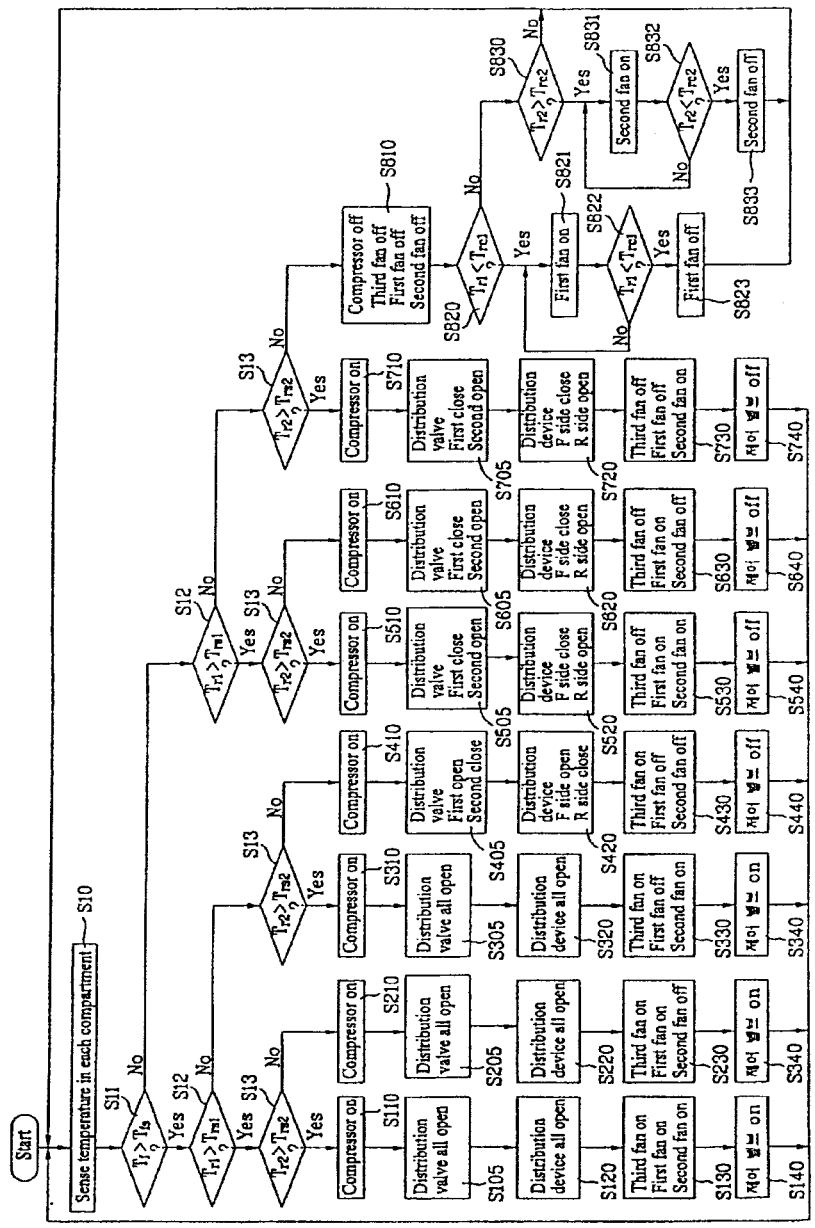
FIG. 7 is a flow chart illustrating a method for controlling the refrigerator according to a third embodiment of the present invention.

As shown in FIG. 7, the third embodiment of the control method of the present invention is to control the refrigeration cycle device of the refrigerator according to the present invention shown in FIG. 2. In other words, the third embodiment of the control method is to control the refrigerator with the plural condensers so that the condensation can be achieved adequately for respective operating modes.

First, a temperature in each of the cooling compartments is sensed at step S10, and it is determined whether the temperature in each of the cooling compartments is within a set temperature zone. In other words, it is sequentially determined whether Tf is higher than Tfs at step S11, whether Tr1 is higher than Trs1 at step S12, and whether Tr2 is higher than Trs2 at step S13.

According to the results of the aforementioned determination steps, an operating mode (first to eighth operating modes) is determined. Since preconditions by which the first to eighth operating modes are determined in the third embodiment are the same as those in the first and second embodiments of the present invention shown in FIGS. 5 and 6, explanation thereof is substituted by the above corresponding explanation of the first and second embodiments.

In the first operating mode, the compressor is operated at step S110, and the distribution valve is fully opened at step S115. The distribution valve distributes the refrigerant to be supplied to the first condenser 210 and the second condenser 220 (here, a side of the distribution valve directed to the first condenser is defined as a first side, and a side of the distribution valve directed to the second condenser is defined as a second side). At step S115, the refrigerant is supplied to both the first side and the second side. After step S115, the distribution device is fully opened at step S120. The distribution device distributes the refrigerant to be supplied to the first cold air generating unit and the second cold air generating unit (here, a side of the distribution device directed to the first cold air generating unit is defined as an R side, and a side of the distribution device directed to the second cold air generating unit is defined as an F side). At step S120, the refrigerant is supplied to both the F side and the R side. In such a first operating mode, the control part operates the first fan, the second fan and the third fan at step S130. At this time, the control part opens the control valve to get rid of the pressure difference between the F side and the R side at step S140. Then, the process goes back to step S10.

In the second operating mode, the compressor is operated at step S210, the distribution valve is fully opened at step S215, and the distribution device is fully opened at step S220. In other words, the refrigerant is supplied to both the F side and the R side. The first fan and the third fan are operated, and the operation of the second fan is stopped at step S230. At this time, the control part opens the control valve to get rid of the pressure difference between the F side and the R side at step S240. Then, the process goes back to step S10.

In the third operating mode, the compressor is operated at step S310, the distribution valve is fully opened at step S315, and the distribution device is fully opened at step S320. In other words, the refrigerant is supplied to both the F side and the R side. The second fan and the third fan are operated, and the operation of the first fan is stopped at step S330. At this time, the control part opens the control valve to get rid of the pressure difference between the F side and the R side at step S340. Then, the process goes back to step S10.

In the fourth operating mode, the compressor is operated at step S410. The first side of the distribution valve is opened and the second side of the distribution valve is closed at step S415. The F side of the distribution device is opened and the R side of the distribution device is closed at step S420. In other words, the refrigerant is supplied to the F side, and the refrigerant is not supplied to the R side. The third fin is operated, and the operation of the first fan and the second fan is stopped at step S430. At this time, the control part closes the control valve at step S440. Then, the process goes back to step S10.

In the fifth operating mode, the compressor is operated at step S510. The first side of the distribution valve is closed and the second side of the distribution valve is opened at step S515. The F side of the distribution device is closed and the R side of the distribution device is opened at step S520. In other words, the refrigerant is supplied to the R side, and the refrigerant is not supplied to the F side. The first fan and the second fan are operated, and the operation of the third fan is stopped at step S530. At this time, the control part closes the control valve at step S540. Then, the process goes back to step S10.

In the sixth operating mode, the compressor is operated at step S610. The first side of the distribution valve is closed and the second side of the distribution valve is opened at step S615. The F side of the distribution device is closed and the R side of the distribution device is opened at step S620. In other words, the refrigerant is supplied to the R side, and the refrigerant is not supplied to the F side. The first fan is operated, and the operation of the second fan and the third fan is stopped at step S630. At this time, the control part closes the control valve at step S640. Then, the process goes back to step S10.

In the seventh operating mode, the compressor is operated at step S710. The first side of the distribution valve is closed and the second side of the distribution valve is opened at step S715. The F side of the distribution device is closed and the R side of the distribution device is opened at step S720. In other words, the refrigerant is supplied to the R side, and the refrigerant is not supplied to the F side. The second fan is operated, and the operation of the first fan and the third fan is stopped at step S730. At this time, the control part closes the control valve at step S740. Then, the process goes back to step S10.

In the eighth operating mode, the operation of the compressor, the first fan, the second fan and the third fan is totally stopped at step S810. Steps S820, S821, S822 and S823 and steps S830, S831, S832 and S833 shown in FIGS. 5 and 6 are identically applied to the third embodiment.

Hereinafter, a fourth embodiment of the control method for the refrigerator according to the present invention will be described with reference to FIG. 8.

Figure 8:
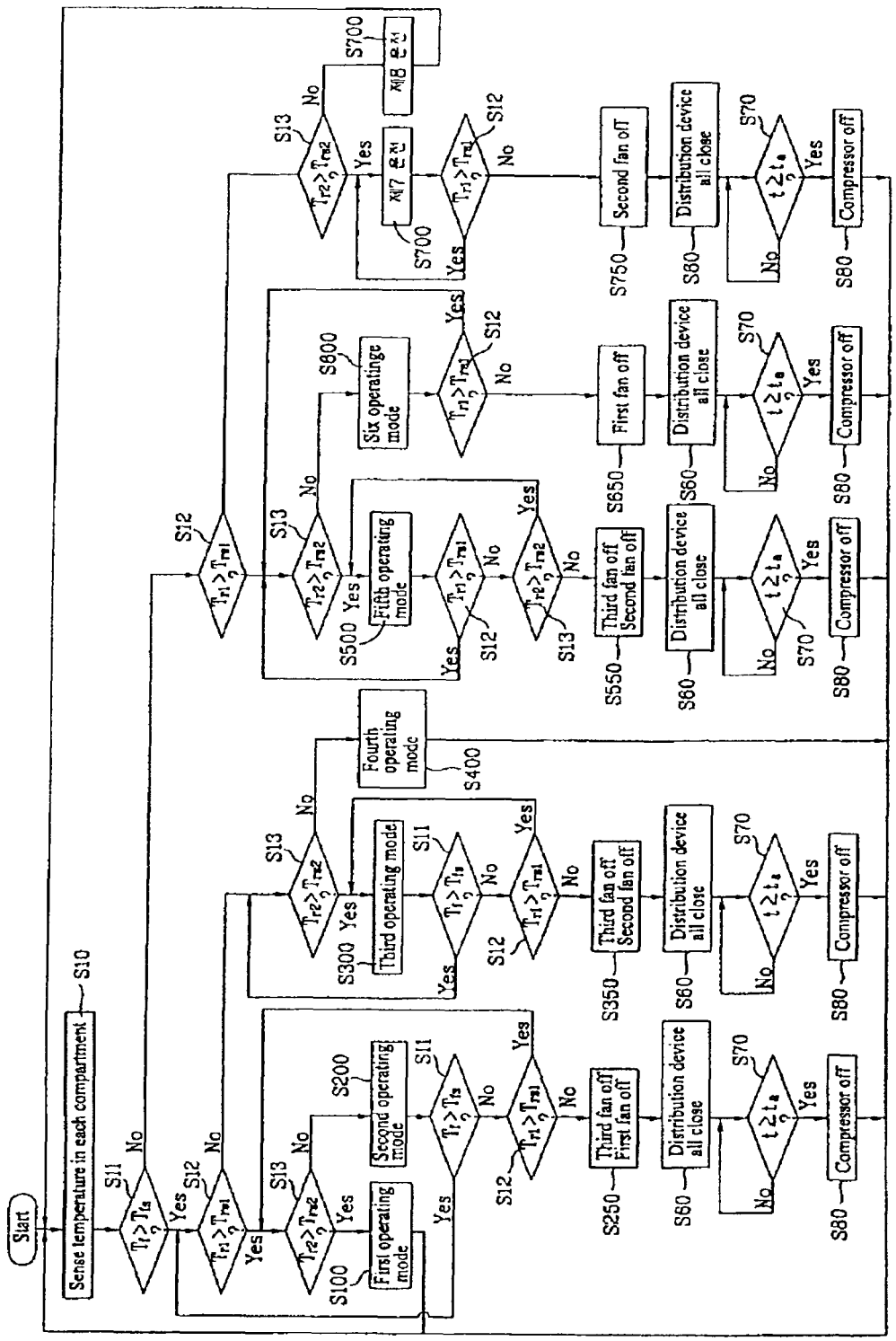
FIG. 8 is a flow chart illustrating a method for controlling the refrigerator according to a fourth embodiment of the present invention.

Identically to the first to third embodiments, in the fourth embodiment shown in FIG. 8, respective operating modes (first to eighth operating modes) are determined through steps S10, S11, S12 and S13. Preconditions by which the first to eighth operating modes are determined in the fourth embodiment are the same as those in the first to third embodiments.

As shown in FIG. 8, step S100 denotes the first operating mode. The first operating mode may include steps S110, S120, S130 and S140 as described in the first embodiment and the second embodiment. The first operating mode may further include step S115 as described in the third embodiment.

Step S200 denotes the second operating mode. The second operating mode may include steps S210, S220, S230 and S240 as described in the first embodiment and the second embodiment. The second operating mode may further include step S215 as described in the third embodiment.

Step S300 denotes the third operating mode. The third operating mode may include steps S310, S320, S330 and S340 as described in the first embodiment and the second embodiment. The third operating mode may further include step S315 as described in the third embodiment.

Step S400 denotes the fourth operating mode. The fourth operating mode may include steps S410, S420, S430 and 5440 as described in the first embodiment and the second embodiment. The fourth operating mode may further include step S415 as described in the third embodiment.

Step S500 denotes the fifth operating mode. The fifth operating mode may include steps S510, S520, S530 and S540 as described in the first embodiment and the second embodiment. The fifth operating mode may further include step S515 as described in the third embodiment.

Step S600 denotes the sixth operating mode. The sixth operating mode may include steps S610, S620, S630 and S640 as described in the first embodiment and the second embodiment. The sixth operating mode may further include step S615 as described in the third embodiment.

Step S700 denotes the seventh operating mode. The seventh operating mode may include steps S710, S720, S730 and S740 as described in the first embodiment and the second embodiment. The seventh operating mode may further include step S715 as described in the third embodiment.

Step S800 denotes the eighth operating mode. The eighth operating mode may include steps S810, S820, S821, S822 and S823, and steps S830, S831, S832 and S833 as described in the first to third embodiments.

As shown in FIG. 8, the fourth embodiment of the control method for the refrigerator according to the present invention requires a separate control to collect a residual refrigerant which stays by a certain amount in the system in the second, third, fifth, sixth and seventh operating modes.

The control method for the refrigerator according to the fourth embodiment is performed in such a way that when the temperature control for each of the cooling compartments is totally achieved, the distribution device is fully closed and the compressor is operated for a predetermined time, thereby collecting the residual refrigerant in the respective evaporators. Such a residual refrigerant collecting process will now be explained in detail.

After the second operating mode at step S200, it is determined whether Tf is higher than Tfs (Tf>Tfs) at step S11, and it is determined whether Tr1 is higher than Trs1 (Tr1>Trs1) at step S12. This is to check if the temperature control for the freezing compartment and the first refrigerating compartment has been achieved, because the second operating mode is performed in a case of Tf>Tfs, Tr1>Trs1 and Tr2≦Trs2, that is, the freezing compartment and the first refrigerating compartment are unsatisfied cooling compartments. If Tf is higher than Tfs (Tf>Tfs), the process goes back to the step of determining the operating mode, and then the control according to the operating mode thus determined is carried out. If Tf is equal to or less than Tfs (Tf≦Tfs), it is determined whether Tr1 is higher than Trs1 (Tr1>Trs1). If it is determined that Tr1 is higher than Trs1 (Tr1>Trs1), the process goes back to the step of determining the operating mode. If Tr1 is equal to or less than Trs1 (Tr1≦Trs1), the refrigerant collecting operation is performed. In other words, the operation of the first fan and the third fan is stopped at step S250, and the distribution device is fully closed at step S60. At this time, the compressor is kept in the operating state, and the residual refrigerant in the respective evaporators is collected into the compressor. Such a refrigerant collecting operation is performed for a predetermined time. Hereinafter, an operating time of the compressor is denoted by t, and a set time for which the refrigerant collecting operation is performed is denoted by ta. It is determined whether t reaches ta (t≧ta) at step S70. If it is determined that t reaches ta (t≧ta), the operation of the compressor is stopped at step S80. Then, the process goes back to step S10.

After the third operating mode at step S300, it is determined whether Tf is higher than Tfs (Tf>Tfs) at step S11, and it is determined whether Tr2 is higher than Trs2 (Tr2>Trs2) at step S13. This is to check if the temperature control for the freezing compartment and the second refrigerating compartment has been achieved, because the third operating mode is performed in a case of Tf>Tfs, Tr1≦Trs1 and Tr2>Trs2, that is, the freezing compartment and the second refrigerating compartment are unsatisfied cooling compartments. If Tf is higher than Tfs (Tf>Tfs), the process goes back to the step of determining the operating mode, and then the control according to the operating mode thus determined is carried out. If Tf is equal to or less than Tfs (Tf≦Tfs), it is determined whether Tr2 is higher than Trs2 (Tr2>Trs2). If it is determined that Tr2 is higher than Trs2 (Tr2>Trs2), the process goes back to the step of determining the operating mode. If Tr2 is equal to or less than Trs2 (Tr2≦Trs2), the refrigerant collecting operation is performed. In other words, the operation of the second fan and the third fan is stopped at step S350, and the distribution device is fully closed at step S60. At this time, the compressor is kept in the operating state, and the residual refrigerant in the respective evaporators is collected into the compressor. Such a refrigerant collecting operation is performed for the set time ta. It is determined whether t reaches ta (t≧ta) at step S70. If it is determined that t reaches ta (t≧ta), the operation of the compressor is stopped at step S80. Then, the process goes back to step S10.

After the fifth operating mode at step S500, it is determined whether Tr1 is higher than Trs1 (Tr1>Trs1) at step S12, and it is determined whether Tr2 is higher than Trs2 (Tr2>Trs2) at step S13. This is to check if the temperature control for the first refrigerating compartment and the second refrigerating compartment has been achieved, because the fifth operating mode is performed in a case of Tf≦Tfs, Tr1>Trs1 and Tr2>Trs2, that is, the first refrigerating compartment and the second refrigerating compartment are unsatisfied cooling compartments. If Tr1 is higher than Trs1 (Tr1>Trs1), the process goes back to the step of determining the operating mode, and then the control according to the operating mode thus determined is carried out. If Tr1 is equal to or less than Trs1 (Tr1≦Trs1), it is determined whether Tr2 is higher than Trs2 (Tr2>Trs2). If it is determined that Tr2 is higher than Trs2 (Tr2>Trs2), the process goes back to the step of determining the operating mode. If Tr2 is equal to or less than Trs2 (Tr2≦Trs2), the refrigerant collecting operation is performed. In other words, the operation of the first fan and the second fan is stopped at step S550, and the distribution device is fully closed at step S60. At this time, the compressor is kept in the operating state, and the residual refrigerant in the respective evaporators is collected into the compressor. Such a refrigerant collecting operation is performed for the set time ta. It is determined whether t reaches ta (t≧ta) at step S70. If it is determined that t reaches ta (t≧ta), the operation of the compressor is stopped at step S80. Then, the process goes back to step S10.

After the sixth operating mode at step S600, it is determined whether Tr1 is higher than Trs1 (Tr1>Trs1) at step S12. This is to check if the temperature control for the first refrigerating compartment has been achieved, because the sixth operating mode is performed in a case of Tf≦Tfs, Tr1>Trs1 and Tr2≦Trs2, that is, only the first refrigerating compartment is an unsatisfied cooling compartment. If Tr1 is higher than Trs1 (Tr1>Trs1), the process goes back to the step of determining the operating mode, and then the control according to the operating mode thus determined is carried out. If Tr1 is equal to or less than Trs1 (Tr1≦Trs1), the refrigerant collecting operation is performed. In other words, the operation of the first fan is stopped at step S650, and the distribution device is fully closed at step S60. At this time, the compressor is kept in the operating state, and the residual refrigerant in the respective evaporators is collected into the compressor. Such a refrigerant collecting operation is performed for the set time ta. It is determined whether t reaches ta (t≧ta) at step S70. If it is determined that t reaches ta (t≧ta), the operation of the compressor is stopped at step S80. Then, the process goes back to step S10.

After the seventh operating mode at step S700, it is determined whether Tr2 is higher than Trs2 (Tr2>Trs2) at step S13. This is to check if the temperature control for the second refrigerating compartment has been achieved, because the seventh operating mode is performed in a case of Tf≦Tfs, Tr1≦Trs1 and Tr2>Trs2, that is, only the second refrigerating compartment is an unsatisfied cooling compartment. If Tr2 is higher than Trs2 (Tr2>Trs2), the process goes back to the step of determining the operating mode, and then the control according to the operating mode thus determined is carried out. If Tr2 is equal to or less than Trs2 (Tr2≦Trs2), the refrigerant collecting operation is performed. In other words, the operation of the second fan is stopped at step S750, and the distribution device is hilly closed at step S60. At this time, the compressor is kept in the operating state, and the residual refrigerant in the respective evaporators is collected into the compressor. Such a refrigerant collecting operation is performed for the set time ta. It is determined whether t reaches ta (t≧ta) at step S70. If it is determined that t reaches ta (t≧ta), the operation of the compressor is stopped at step S80. Then, the process goes back to step S10.

Through the above-described control process, the precise temperature control for each of the cooling compartments can be achieved and the refrigerant can be securely collected in the respective operating modes. Accordingly, the overall performance of the system can be enhanced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Industrial Applicability

As apparent from the above description, according to the refrigerator and the control method for the same of the present invention, the precise temperature control for the cooling compartments can be achieved so that the cooling compartments can be respectively cooled down in various temperature zones, the temperature in the cooling compartments can be efficiently controlled, and the refrigerant does not remain in the system. Accordingly, the overall performance of the system is enhanced.

The invention claimed is:

1. A control method for a refrigerator, the control method comprising:

sensing a temperature in each of a plurality of cooling compartments;

determining an operating mode by determining whether the temperature in each of the plurality of cooling compartments is within a respective preset temperature zone; and controlling a refrigeration cycle device according to the determined operating mode to make the temperature in each of the plurality of cooling compartments within the respective preset temperature zone, wherein the plurality of cooling compartments includes a first refrigerating compartment, a second refrigerating compartment and a freezing compartment, wherein a first cold air generator includes a first refrigerant passage, a first evaporator mounted along the first refrigerant passage and a first fan, which are mounted in the first refrigerating compartment, a first expansion device, and a second evaporator mounted along the first refrigerant passage and a second fan, which are mounted in the second refrigerating compartment, wherein a second cold air generator includes a second refrigerant passage, a third evaporator mounted along the second refrigerant passage and a third fan, which are mounted in the freezing compartment, and a second expansion device, and a connecting device that connects the second refrigerant passage and the first refrigerant passage selectively so that the refrigerant can flow selectively therethrough, thereby decreasing a pressure difference between the refrigerant flowing through the first evaporator and the refrigerant flowing through the second refrigerant passage and controlling a degree of superheat of the refrigerant passing through the first evaporator, wherein the first expansion device has a length shorter than a length of the second expansion device, wherein the connecting device comprises a connecting pipe that connects a downstream side of the second evaporator along the first refrigerant passage and an upstream side of the third evaporator along the second refrigerant passage, and a control valve mounted in the connecting pipe that controls a flow of the refrigerant, and wherein the controlling of the refrigeration cycle device comprises flowing a refrigerant through the first and second expansion devices to cool down the plurality of cooling compartments, respectively.

2. The control method according to claim 1, wherein when a first operating mode for cooling down the first refrigerating compartment, the second refrigerating compartment, and the freezing compartment is determined in the determining the operating mode, the controlling the refrigeration cycle device includes:

operating a compressor;
fully opening a distribution device; and
operating the first fan, the second fan, and the third fan.

3. The control method according to claim 1, wherein when a second operating mode for cooling down the first refrigerating compartment and the freezing compartment is determined in the determining the operating mode, the controlling the refrigeration cycle device includes:
   operating a compressor;
   fully opening a distribution device; and
   operating the first fan and the third fan and stopping operation of the second fan.

4. The control method according to claim 1, wherein when a third operating mode for cooling down the second refrigerating compartment and the freezing compartment is determined in the determining the operating mode, the controlling the refrigeration cycle device includes:
   operating a compressor;
   fully opening a distribution device; and
   operating the second fan and the third fan and stopping operation of the first fan.

5. The control method according to claim 1, wherein when a fourth operating mode for cooling down the freezing compartment is determined in the determining the operating mode, the controlling the refrigeration cycle device includes:
   operating a compressor;
   opening an F side of a distribution device and closing an R side of the distribution device; and
   operating the third fan and stopping operation of the first fan and the second fan.

6. The control method according to claim 1, wherein when a fifth operating mode for cooling down the first refrigerating compartment and the second refrigerating compartment is determined in the determining the operating mode, the controlling the refrigeration cycle device includes:
   operating a compressor;
   closing an F side of a distribution device and opening an R side of the distribution device; and
   operating the first fan and the second fan and stopping operation of the third fan.

7. The control method according to claim 1, wherein when a sixth operating mode for cooling down the first refrigerating compartment is determined in the determining the operating mode, the controlling the refrigeration cycle device includes:
   operating a compressor;
   closing an F side of a distribution device and opening an R side of the distribution device; and
   operating the first fan and stopping operation of the second fan and the third fan.

8. The control method according to claim 1, wherein when a seventh operating mode for cooling down the second refrigerating compartment is determined in the determining the operating mode, the controlling the refrigeration cycle device includes:
   operating a compressor;
   closing an F side of a distribution device and opening an R side of the distribution device; and
   operating the second fan and stopping operation of the first fan and the third fan.

9. The control method according to claim 1, wherein when it is determined that the temperature in the first refrigerating compartment, the second refrigerating compartment, and the freezing compartment is equal to or less than a maximum value in each respective preset temperature zone, and an eighth operating mode is determined in the determining the operating mode, the controlling the refrigeration cycle device includes stopping operation of a compressor, the first fan, the second fan, and the third fan.

10. The control method according to claim 9, further comprising:
   determining whether at least one of the first refrigerating compartment or the second refrigerating compartment is subcooled and the temperature in the subcooled cooling compartment is lower than a minimum value in the respective preset temperature zone; and
   when it is determined that at least one of the first refrigerating compartment or the second refrigerating compartment is subcooled, operating one of the respective first fan or the second fan in the subcooled cooling compartment while stopping operation of the compressor until the temperature in the subcooled cooling compartment is within the preset temperature zone.

11. The control method according to claim 9, further comprising:
   determining whether at least one of the first refrigerating compartment or the second refrigerating compartment is subcooled and the temperature in the subcooled cooling compartment is lower than a minimum value in the respective preset temperature zone; and
   when it is determined that at least one of the first refrigerating compartment or the second refrigerating compartment is subcooled, operating one of the respective first fan or the second fan in the subcooled cooling compartment for a preset time while stopping operation of the compressor.

12. The control method according to claim 2, further comprising:
   opening the control valve to connect the first and second evaporators and the third evaporator in a series form, through which the refrigerant flows, wherein a pressure difference between the first and second evaporators and the third evaporator is removed such that the refrigerant returns into the compressor.

13. The control method according to claim 3, further comprising:
   when the temperature in the first refrigerating compartment, the second refrigerating compartment, and the freezing compartment is within each respective preset temperature zone as a result of the second operating mode, collecting a residual refrigerant in the refrigeration cycle device by operating the compressor for a preset time while stopping operation of the first fan, the second fan, and the third fan, and fully closing the distribution device.

14. The control method according to claim 4, further comprising:
   when the temperature in the first refrigerating compartment, the second refrigerating compartment, and the freezing compartment is within each respective preset temperature zone as a result of the third operating mode, collecting a residual refrigerant in the refrigeration cycle device by operating the compressor for a preset time while stopping operation of the first fan, the second fan, and the third fan, and fully closing the distribution device.

15. The control method according to claim 6, further comprising:
   when the temperature in the first refrigerating compartment, the second refrigerating compartment, and the freezing compartment is within each respective preset temperature zone as a result of the fifth operating mode, collecting a residual refrigerant in the refrigeration cycle device by operating the compressor for a preset time while stopping operation of the first fan, the second fan, and the third fan, and fully closing the distribution device.

16. The control method according to claim 7, further comprising:

when the temperature in the first refrigerating compartment, the second refrigerating compartment, and the freezing compartment is within each respective preset temperature zone as a result of the sixth operating mode, collecting a residual refrigerant in the refrigeration cycle device by operating the compressor for a preset time while stopping operation of the first fan, the second fan, and the third fan, and fully closing the distribution device.

17. The control method according to claim 8, further comprising:

when the temperature in the first refrigerating compartment, the second refrigerating compartment, and the freezing compartment is within each respective preset temperature zone as a result of the seventh operating mode, collecting a residual refrigerant in the refrigeration cycle device by operating the compressor for a preset time while stopping operation of the first fan, the second fan, and the third fan, and fully closing the distribution device.

18. A refrigerator, comprising:

a main body provided with a plurality of cooling compartments;

a compressor that compresses a refrigerant and discharges the refrigerant;

a condenser that condenses the refrigerant discharged from the compressor;

a distribution device that distributes the refrigerant condensed by the condenser;

a first cold air generator that includes a plurality of evaporators connected to each other in a series that generates cold air in a part of the plurality of cooling compartments through the refrigerant distributed to a first refrigerant passage from the distribution device, and a plurality of fans that blows the cold air generated from the respective plurality of evaporators;

a second cold air generator that includes at least one evaporator connected to the first cold air generator in parallel that generates cold air in the other part of the plurality of cooling compartments through the refrigerant distributed to a second refrigerant passage from the distribution device, at least one fan that blows the cold air generated from the at least one evaporator, and a connecting device that connects the second refrigerant passage and the first refrigerant passage selectively so that the refrigerant flows selectively therethrough, thereby decreasing a pressure difference between the refrigerant flowing through a first evaporator of the plurality of evaporators and the refrigerant flowing through the second refrigerant passage and controlling a degree of superheat of the refrigerant passing through the first evaporator;

a sensor that senses a temperature in each of the plurality of cooling compartments; and a controller that controls a temperature in each of the plurality of cooling compartments according to the temperature sensed by the sensor, wherein the connecting device comprises a connecting pipe that connects a downstream side of the second evaporator in the first refrigerant passage and an upstream side of the at least one evaporator in the second refrigerant passage, and a control valve mounted in the connecting pipe that controls a flow of the refrigerant.

19. The refrigerator according to claim 18, wherein the plurality of cooling compartments includes a first refrigerating compartment, a second refrigerating compartment, and a freezing compartment, wherein the first cold air generator includes a first evaporator and a first fan, which are mounted in the first refrigerating compartment, and a second evaporator and a second fan, which are mounted in the second refrigerating compartment, and wherein the second cold air generator includes a third evaporator and a third fan, which are mounted in the freezing compartment.

\* \* \* \* \*